US011374705B2

(12) United States Patent
Masal et al.

(10) Patent No.: US 11,374,705 B2
(45) Date of Patent: Jun. 28, 2022

(54) METHOD AND APPARATUS FOR DATA COMMUNICATION IN ORTHOGONAL FREQUENCY DIVISION MULTIPLEXING SYSTEM

(71) Applicants: Centre of Excellence in Wireless Technology, Chennai (IN); Indian Institute of Technology Madras (IIT Madras), Chennai (IN)

(72) Inventors: Abhijeet Abhimanyu Masal, Chennai (IN); Priyanka Dey, Chennai (IN); Sunil Kaimalettu, Chennai (IN); Dhivagar Baskaran, Chennai (IN); Paka Venkata Sriharsha, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 0 days.

(21) Appl. No.: 17/138,545

(22) Filed: Dec. 30, 2020

(65) Prior Publication Data
US 2021/0126752 A1 Apr. 29, 2021

Related U.S. Application Data

(63) Continuation of application No. 16/584,003, filed on Sep. 26, 2019, now Pat. No. 10,911,191.

(30) Foreign Application Priority Data

Sep. 27, 2018 (IN) .............................. 201841036605

(51) Int. Cl.
*H04L 5/00* (2006.01)
*H04L 27/26* (2006.01)

(52) U.S. Cl.
CPC .......... *H04L 5/0007* (2013.01); *H04L 5/0042* (2013.01); *H04L 5/0044* (2013.01);
(Continued)

(58) Field of Classification Search
CPC ... H04L 5/0048; H04L 5/0007; H04L 5/0044; H04L 27/2602; H04L 27/2626; H04L 27/2628; H04L 27/2607; H04L 5/0042
(Continued)

(56) References Cited

U.S. PATENT DOCUMENTS 10,911,191 B2 * 2/2021 Masai ................... H04L 5/0007
2019/0312669 A1 * 10/2019 Kwak ...................... H04L 1/00
(Continued)

*Primary Examiner* — Emmanuel Bayard

(57) ABSTRACT

Embodiments herein provides a method and apparatus for data communication in an OFDM system. The method comprising receiving by a second OFDM apparatus a plurality of parameters, a signal comprising data and at least one of a Reference Signal (RS) and a message from a first OFDM apparatus. The plurality of parameters comprises at least one of a numerology of the first apparatus, a numerology of the second apparatus, a ratio of numerology of the first apparatus to the second apparatus and a measurement window. The method includes filtering a desired band comprising the at least one of the RS and the message from the received signal, removing a cyclic prefix from the filtered signal, and decoding at least one of the RS and the message from the signal with adjusting a circular shift in the set of symbols based on the plurality of parameters.

8 Claims, 14 Drawing Sheets

(52) U.S. Cl.
CPC ........ *H04L 5/0048* (2013.01); *H04L 27/2607* (2013.01); *H04L 27/2628* (2013.01)

(58) Field of Classification Search
USPC .................................. 375/130, 260, 295, 340
See application file for complete search history.

(56) References Cited

U.S. PATENT DOCUMENTS

2020/0008228 A1\* 1/2020 Lee ....................... H04L 27/261
2020/0067680 A1\* 2/2020 Nayeb Nazar ........ H04L 1/1671

\* cited by examiner

| BS1 | D | X | X | XU | XU | X | XU | XU | X | XU | XU | X | X | X |
|-----|---|---|---|----|----|---|----|----|---|----|----|---|---|---|
| BS2 | XU | XU | X | D | X | X | XU | XU | X | XU | XU | X | X | X |
| BS3 | XU | XU | X | XU | XU | X | D | X | X | XU | XU | X | X | X |
| BS4 | XU | XU | X | XU | XU | X | XU | XU | X | D | X | X | X | X |

FIG. 8

METHOD AND APPARATUS FOR DATA COMMUNICATION IN ORTHOGONAL FREQUENCY DIVISION MULTIPLEXING SYSTEM

The present application is a continuation application of U.S. Ser. No. 16/584,003 filed on 26 Sep. 2019 which claims priority from an Indian Application Number 201841036605 filed on 27 Sep. 2018, the disclosure of which is hereby incorporated by reference herein. The present invention relates to a wireless communication system, and more specifically relates to a method and apparatus for managing communication operations in an Orthogonal Frequency Division Multiplexing (OFDM) system.

FIELD OF THE INVENTION

Background of Invention

A fourth-generation (4G) long term evolution (LTE) and a fifth-generation (5G) new radio (NR) technologies use orthogonal frequency division multiplexing (OFDM) based air interface for multiple access. An OFDM node transmits OFDM symbols with subcarrier spacing dependent symbol duration. This symbol duration decreases with increase in the subcarrier spacing. The LTE uses 15 kHz as the subcarrier spacing for a data transmission whereas the NR allows multiple subcarrier spacing for the data transmission. A system that allows multiple subcarrier spacing is called multiple numerology system. Generally, symbol boundaries are expected to be aligned for detection of a received signal, otherwise, it may lead to detection of errors. However, if a receive node is not time-synchronized with a transmit node, and/or if the transmit node and the receive node are using different subcarrier spacing, then the symbol boundaries may not be aligned at a receiver. The mismatch or misalignment is either due to propagation delay and/or due to the receiver processing with different numerology. This is termed here as asynchronous transmission and reception. Therefore, there is a need for a transceiver to be designed to enable asynchronous transmission and reception. Examples of asynchronous reception are interference occurring from an unsynchronised interfering node and the receiver processing with different numerology than that of a transmitter.

A node transmits messages, which can be received by other nodes within a network. In the network that uses multiple numerologies, it is possible that the message transmitted with one numerology is received by the nodes using different numerologies. Example being a node broadcasting a message using 15 kHz subcarrier spacing can be received and decoded by the nodes using the numerologies 15 kHz, 30 kHz, 60 kHz, etc., and vice-versa. The transmitted signal includes a broadcast message, multicast message, unicast message, control information, reference signal for interference measurement, etc.

Base station to base station (BS-to-BS) interference is a well-known problem in time division duplex (TDD) networks when an uplink (UL) and a downlink (DL) are not aligned across the cells in the same and adjacent bands. Traditionally, it is solved by adopting the same DL:UL ratio across networks in a time-synchronous manner, additional guard time, etc. However, this method leads to inefficiencies in heterogeneous scenario due to the different traffic requirement of each BSs, hence affects the network performance and throughput. As shown in FIG. 1, Node 1 is performing the DL transmission to Node 3, while Node 4 is performing the UL transmission to Node 2 in the same time-frequency resources. As a result, the DL from the Node 1 will cause interference to the desired UL signal from the node 4 at the Node 2. Besides that, the BS to BS interference might also be prominent when the DL signal from the Node 1 will reach the Node2 when a propagation delay exceeds a gap period between the DL to UL transition even if the network is synchronized. Depending on the distance between the Node 1 and the Node 2, at least two scenarios arise such as, i. When two nodes are near to each other, an interfering signal from one node will be received by another node with the slot boundaries of the interfering signal and a desired signal is either aligned with each other or with misalignment within the cyclic prefix (CP) duration. When the interfering signal and the desired signals use different numerology, different numerology leads to degraded system performance, and therefore need interference mitigation schemes. For e.g., interference between BS and user equipment (UE), relay and UE, etc. The interference between nodes of the same type is called cross-link interference (CLI), and cross-link interference occurs when the dynamic DL:UL ratio is used by BSs in TDD system, or in in-band full-duplex systems. For e.g., CLI can be between BS to BS, relay to relay, UE to UE, etc. For e.g., Node 1 is transmitting at 30 kHz numerology, Node 3 is receiving at 30 kHz numerology while Node 2 is receiving at 15 kHz numerology.

ii. When the nodes are far away from each other (remote nodes), then the propagation delay between them is higher than CP. sometimes higher than OFDM symbol duration itself. This cause's interference signal from one node to another node with the slot boundaries of the interfering signal and the desired signal are completely misaligned. One such remote interference is due to the tropospheric ducting as mentioned in FIG. 1.

Thus, it is desired to address the above-mentioned disadvantages or other shortcomings or at least provide a useful alternative.

OBJECT OF THE INVENTION

The principal object of the embodiments herein is to provide a method and apparatus for managing communication operations in an Orthogonal Frequency Division Multiplexing system (OFDM).

Another object of the invention is to generate a signal comprising data and at least one of a Reference Signal (RS) and a message by repeating the at least one of the RS and the message over a set of OFDM symbols using a resource mapper, performing an Inverse Fourier Transform operation (IFFT) according to a numerology of a first OFDM apparatus, adding a Cyclic Prefix (CP) to the data, and adding a block CP to the at least one of the repeated RS and the message.

Another object of the invention is to generate the signal comprising data and at least one of the RS and the message by repeating the at least one of the RS and the message over the set of OFDM symbols using the resource mapper with a phase rotation, performing the IFFT operation according to the numerology of the first OFDM apparatus, and adding the cyclic prefix.

Another object of the invention is to transmit the signal to a second OFDM apparatus.

Another object of the invention is to estimate an interference by monitoring consecutive slots or symbols for the interference.

Another object of the invention is to detect estimated interference in the slots or symbols being monitored meets a predefined threshold set by a network entity or by the first OFDM apparatus.

Another object of the invention is to mitigate the interference by performing one of adjusting a Guard Period (GP), adjusting a UL power, adjusting a DL power, switching to a bandwidth part (BWP), tilting a direction of a beam to avoid the interference, and nullifying a beam in a direction of incoming interference.

Another object of the invention is to receive the signal comprising data and at least one of the RS and the message from the first OFDM apparatus.

Another object of the invention is to filter a desired band containing at least one of the RS and the message from the reference signal.

Another object of the invention is to remove the cyclic prefix from the signal and decode at least one of the RS and the message from the signal with adjusting a circular shift in the set of symbol.

BRIEF SUMMARY OF THE INVENTION

Accordingly, the invention provides a method and apparatus for managing communication operations in an Orthogonal Frequency Division Multiplexing (OFDM) system. Further the method includes generating, by a first OFDM apparatus, a signal comprising data and at least one of a Reference Signal (RS) and a message, the signal is generated by repeating the at least one of the RS and the message over a set of OFDM symbols using a resource mapper, performing an Inverse Fourier Transform operation (IFFT) according to a numerology of a first OFDM apparatus, adding a Cyclic Prefix (CP) to the data, and adding a block CP to the at least one of the repeated RS and the message. Further, the method includes transmitting, by the first OFDM apparatus, the signal to a second OFDM apparatus.

Accordingly, the invention provides a method and apparatus for managing communication operations in an OFDM system. Further the method includes generating, by a first OFDM apparatus, a signal comprising data and at least one of a RS and a message, the signal is generated by repeating the at least one of the RS and the message over a set of OFDM symbols using a resource mapper with a phase rotation, performing an IFFT according to a numerology of a first OFDM apparatus, and adding a CP to the data. Further, the method includes transmitting, by the first OFDM apparatus, the signal to a second OFDM apparatus.

Accordingly, the invention provides a method and apparatus for managing communication operations in an OFDM system. Further the method includes receiving, by a second OFDM apparatus, a signal comprising data and at least one of a RS and a message from a first OFDM apparatus, wherein the RS and the message are repeated over a set of OFDM symbols. Further, the method includes filtering, by the second OFDM apparatus, a desired band containing at least one of the RS and the message from the reference signal. Further, the method includes removing, by the second OFDM apparatus, a cyclic prefix from the signal. Further, the method includes decoding, by a second OFDM apparatus, at least one of the RS and the message from the signal with adjusting a circular shift in the set of symbol.

Further, the method includes estimating, by the second OFDM apparatus, an interference by monitoring consecutive slots or symbols for the interference. Further, the method includes detecting, by the second OFDM apparatus, estimated interference in the slots or symbols being monitored meets a predefined threshold set by a network entity or by the first OFDM apparatus. Further, the method includes mitigating, by the second OFDM apparatus, the interference by performing one of adjusting a GP, adjusting a UL power, adjusting a DL power, switching to a BWP, tilting a direction of a beam to avoid the interference, and nullifying a beam in a direction of incoming interference.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 8 illustrates a slot structure of four base stations (BS) to aid an interference measurement, according to embodiments as disclosed herein.

DETAILED DESCRIPTION OF THE INVENTION

Figure 1:
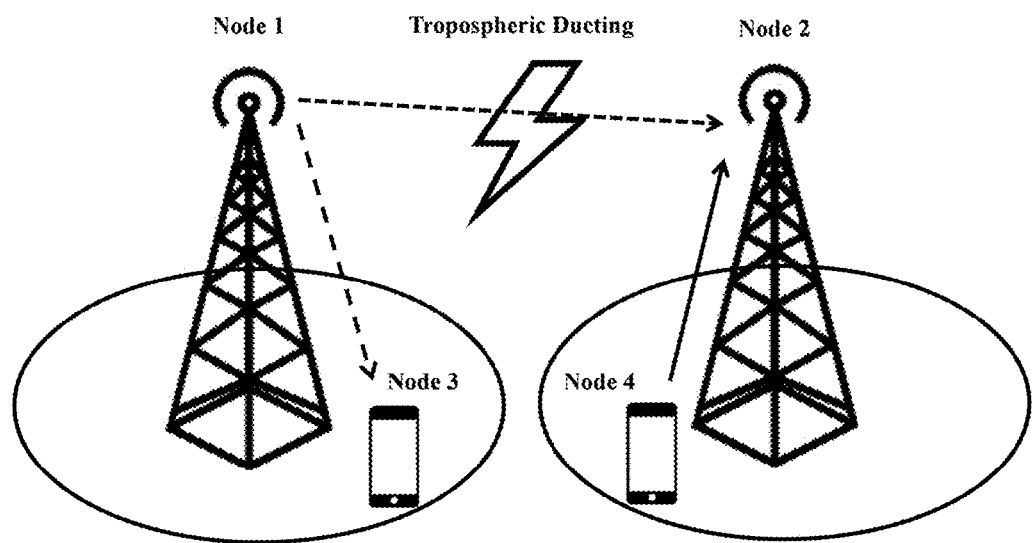
FIG. 1 illustrates an interference due to tropospheric ducting, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the invention provides a method and apparatus for managing communication operations in an Orthogonal Frequency Division Multiplexing (OFDM) system. Further, the method includes generating, by a first OFDM apparatus, a signal comprising data and at least one of a Reference Signal (RS) and a message. Further, the method includes transmitting the signal to a second OFDM apparatus. Further, the method includes estimating, by a second OFDM apparatus, an interference by monitoring consecutive slots or symbols for the interference. Further, the method includes detecting, by the second OFDM apparatus, estimated interference in the slots or symbols being monitored meets a predefined threshold set by a network entity or by the first OFDM apparatus. Further the method includes mitigating, by the second OFDM apparatus, the interference by performing one of adjusting a Guard Period (GP), adjusting an uplink (UL) power, adjusting a downlink (DL) power, switching to a bandwidth part (BWP), tilting a direction of a beam to avoid the interference, and nullifying a beam in a direction of incoming interference.

Referring now to the drawings, and more particularly to FIGS. 2A through 8, where similar reference characters denote corresponding features consistently throughout the figures, there are shown preferred embodiments.

Figure 2A:
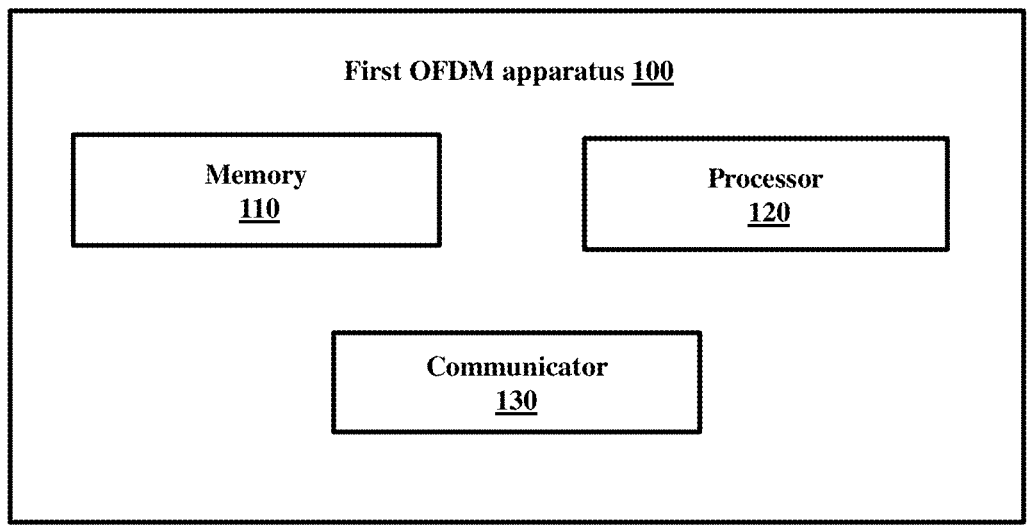
FIG. 2A illustrates a block diagram of a first OFDM apparatus for managing communication operations in an Orthogonal Frequency Division Multiplexing (OFDM) system, according to an embodiment as disclosed herein.

FIG. 2A illustrates a block diagram of a first OFDM apparatus (100) for managing communication operations in an Orthogonal Frequency Division Multiplexing (OFDM) system, according to an embodiment as disclosed herein. In an embodiment, the first OFDM apparatus (100) includes a memory (110), a processor (120), and a communicator (130). The first OFDM apparatus (100) can be, for example, but not limited to a smartphone, base station or a like.

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache).

The processor (120) communicates with the memory (110), and the communicator (130). In an embodiment, the memory (110) can be an internal storage unit or it can be an external storage unit of the first OFDM apparatus (100), a cloud storage, or any other type of external storage. The processor (120) is configured to execute instructions stored in the memory (110) and to perform various processes.

In an embodiment, the processor (120) is configured to generate a signal comprising data and at least one of a Reference Signal (RS) and a message, wherein the signal is generated by repeat the at least one of the RS and the message over a set of OFDM symbols using a resource mapper, perform an Inverse Fourier Transform operation (IFFT) according to a numerology of the first OFDM apparatus (100), add a Cyclic Prefix (CP) to the data, and add a block CP to the at least one of the repeated RS and the message. Further, the processor (120) is configured to transmit the signal to a second OFDM apparatus (200).

In an embodiment, the block CP is derived by adding one CP to the set of OFDM symbols. In an embodiment, a block CP length to the set of OFDM symbols is scaled by number of repetitions.

In an embodiment, repeating the at least one of the RS or the message over the set of OFDM symbols comprises transmit at least one of the RS and the message in a first symbol of the set of OFDM symbols and repeat at least one of the same RS and the same message in consecutive symbols.

In an embodiment, symbol boundaries of the set of OFDM symbols are not in sync with the second OFDM apparatus (200), when the signal is received at the second OFDM apparatus (200).

In an embodiment, repeating the at least one of the RS or the message over the set of OFDM symbols includes determining whether the numerology at the first OFDM apparatus (100) is one of same as numerology at the second OFDM apparatus (200), higher that the numerology at the second OFDM apparatus (200), and lower that the numerology at the second OFDM apparatus (200), and performing one of repeating the at least one of the RS and the message over the set of OFDM symbols when the numerology at the first OFDM apparatus (100) is same as the numerology at the second OFDM apparatus (200), wherein the set of OFDM symbols are greater than one and is transmitted with the block CP for all the set of OFDM symbols, repeating the at least one of the RS and the message over the set of OFDM symbols when the numerology at the first OFDM apparatus (100) is higher than the numerology at the second OFDM apparatus (200), wherein the set of OFDM symbols depends on a ratio of the numerology of the first OFDM apparatus (100) to the numerology of the second OFDM apparatus (200), and interleaving the at least one of the RS and the message in a frequency domain and repeating the at least one of the RS and the message over the set of OFDM symbols when the numerology at the first OFDM apparatus (100) is lower than the numerology at the second OFDM apparatus (200), wherein the interleaving is performed based on the ratio of the numerology of the first OFDM apparatus (100) to the numerology of the second OFDM apparatus (200).

In an embodiment, at least one of the RS and the message is spread over a predefined bandwidth, wherein the predefined bandwidth is in multiple of Resource Blocks (RBs) fully or partially span over a configured bandwidth, and wherein the RBs are allocated in a consecutive manner or a continuous manner to avoid possible contamination of reception.

In an embodiment, the set of OFDM symbols is determined as a function of at least one of the numerology used at the first OFDM apparatus (100), the numerology used at the second OFDM apparatus (200), and a propagation delay.

In an embodiment, adding a node identifier in a sequence used for generating the RS to identify an interference at the second OFDM apparatus (200), wherein the node identifier indicates at least one of an interfering node, a group of interfering nodes, a cell, and an interference level.

In an embodiment, the interference level indicates at least one of a remote interference and a cross-link interference.

In an embodiment, the RS is transmitted orthogonally in at least one of a code, the frequency domain, a time domain, and a space domain across various nodes in the OFDM system, based on the node identifier and an interference level and a number of affected symbols.

In an embodiment, in the time domain, the orthogonality is achieved by one of a node transmits the RS at one-time unit while all the other nodes are receiving the RS and a node receives the RS at one instant while all other nodes are transmitting the RS.

In an embodiment, the node identifier is associated with one of the first OFDM apparatus (100) indicating that the first OFDM apparatus (100) is facing the interference from the second OFDM apparatus (200), and the first OFDM apparatus (100) indicating that the first OFDM apparatus (100) is a source of interference for the second OFDM apparatus (200).

In an embodiment, the remote interference, at least one of the first OFDM apparatus (100) and a group of first OFDM apparatus (100), is detected when an Interference over Thermal (IOT) meets a predefined threshold, wherein the IOT is the interference level measured above a thermal noise level.

In an embodiment, the number of affected symbols in a transmission is determined at least one of the first OFDM apparatus (100) from the group of first OFDM apparatus (100) based on at least one of IOT value and a signal to interference plus noise ratio (SINR).

In an embodiment, the number of affected symbols are included in a sequence for generation of a RS to be transmitted from the first OFDM apparatus (100).

In an embodiment, at least one of the first OFDM apparatus (100) and the second OFDM apparatus (200) is configured to transmit the RS in a measurement window comprising a set of one of symbols and slots determined by network based on the interference level, and the number of affected symbols, and wherein the measurement window includes DL-to-UL transition point.

In an embodiment, the RS is transmitted from at least of the first OFDM apparatus (100) and the second OFDM apparatus (200) at a beginning of the measurement window configured by the network.

In an embodiment, the RS is received in at least one of the first OFDM apparatus (100) and the second OFDM apparatus (200) at last N symbols of the measurement window configured by the network, wherein the N symbols are configured by a higher layer.

The communicator (130) is configured for communicating internally between internal hardware components and with external devices via one or more networks.

Although the FIG. 2A shows various hardware components of the first OFDM apparatus (100) but it is to be understood that other embodiments are not limited thereon. In other embodiments, the first OFDM apparatus (100) may include less or more number of components. Further, the labels or names of the components are used only for illustrative purpose and does not limit the scope of the invention. One or more components can be combined together to perform the same or substantially similar function to manage communication operations in the OFDM system.

Figure 2B:
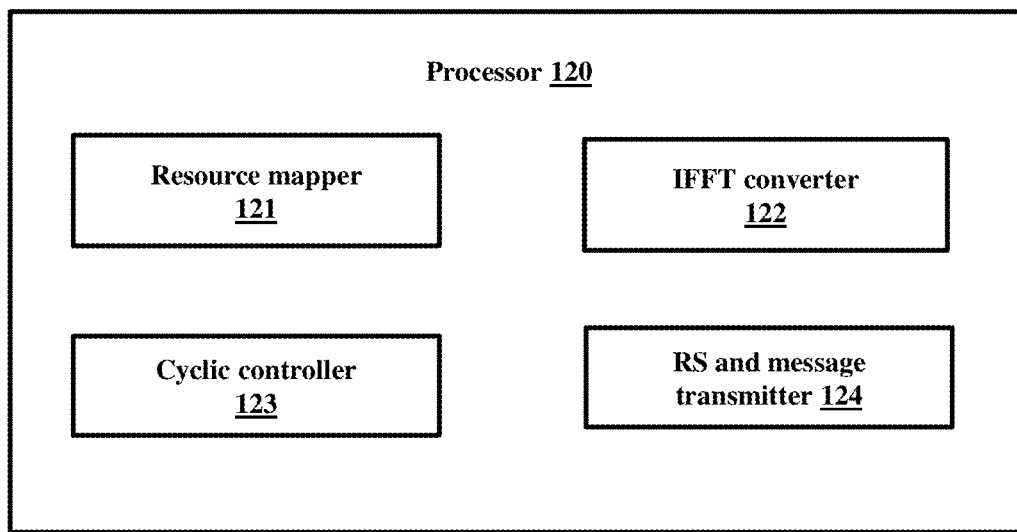
FIG. 2B illustrates a block diagram of a processor of the first OFDM apparatus, according to an embodiment as disclosed herein.

FIG. 2B illustrates a block diagram of the processor (120) of the first OFDM apparatus (100), according to an embodiment as disclosed herein. In an embodiment, the processor (120) includes a resource mapper (121), an IFFT converter (122), a cyclic controller (123), and a RS and message transmitter (124).

The resource mapper (121) repeats the at least one of the RS and the message over the set of OFDM symbols. The IFFT converter (122) performs IFFT operation according to the numerology of the first OFDM apparatus (100). The cyclic controller (123) adds the CP to the data and adds the block CP to the at least one of the repeated RS and the message.

The RS and message transmitter (124) transmits the signal to the second OFDM apparatus (200).

Figure 3A:
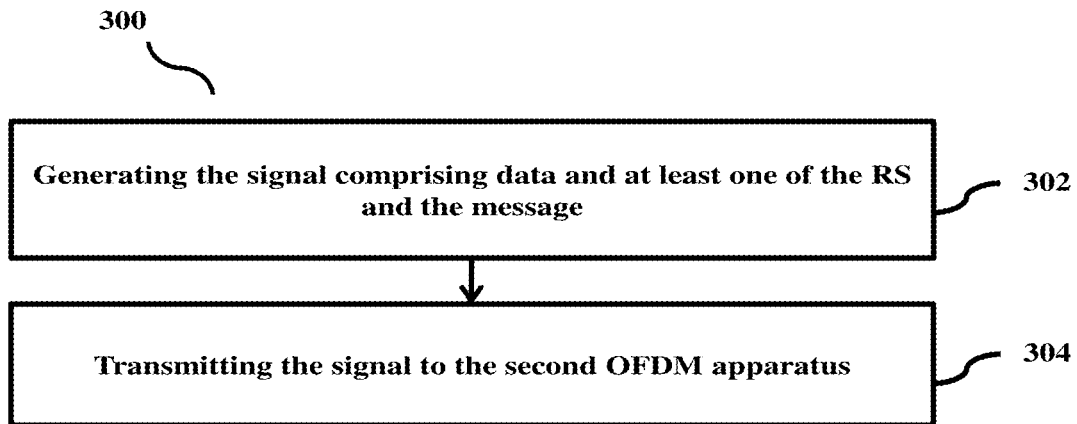
FIG. 3A is a flow diagram illustrating a transmitting method for managing communication operations in the OFDM system, according to an embodiment as disclosed herein.

FIG. 3A is a flow diagram 300 illustrating a transmitting method for managing communication operations in the OFDM system, according to an embodiment as disclosed herein. The operations (302-304) are performed by the first OFDM apparatus (100).

At 302, the method includes generating the signal comprising data and at least one of the RS and the message. At 304, the method includes transmitting the signal to the second OFDM apparatus (200).

Figure 3B:
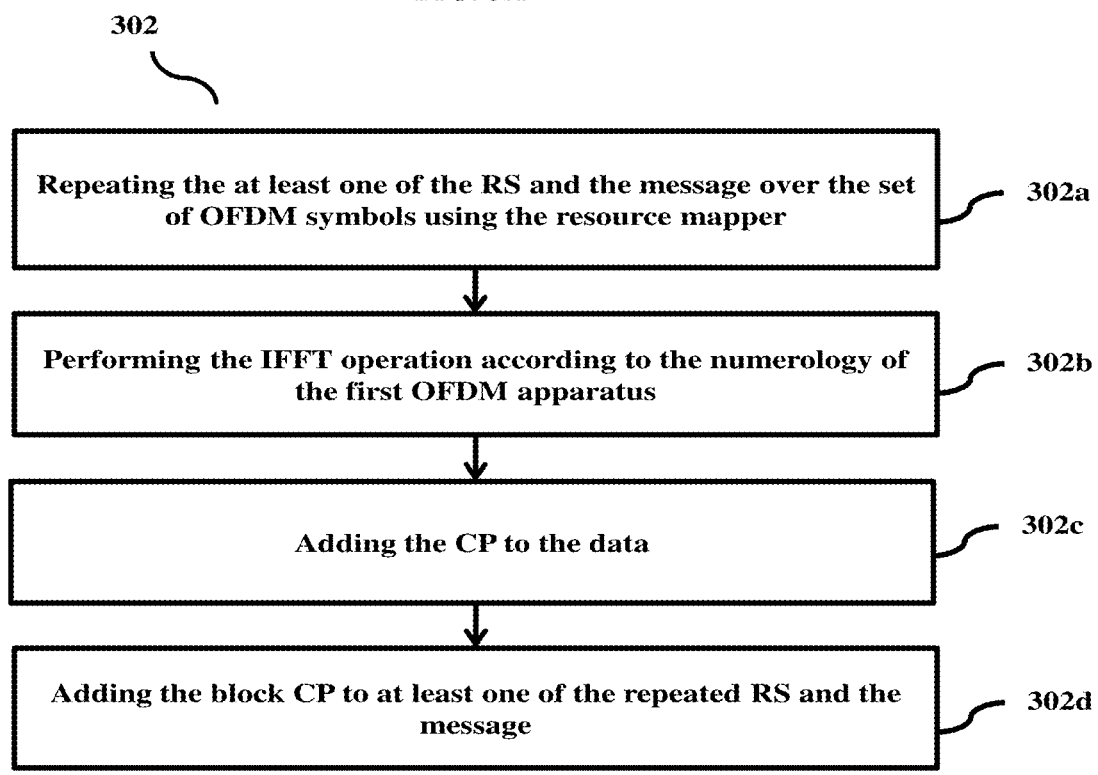
FIG. 3B is a flow diagram illustrating a method for generating a signal using a resource mapper, according to an embodiment as disclosed herein.

FIG. 3B is a flow diagram 302 illustrating a method for generating a signal using a resource mapper, according to an embodiment as disclosed herein. The operations (302a-302d) are performed by the first OFDM apparatus (100).

At 302a, the method includes repeating the at least one of the RS and the message over the set of OFDM symbols using the resource mapper (121). At 302b, the method includes performing the IFFT operation according to the numerology of the first OFDM apparatus (100). At 302c, the method includes adding the CP to the data. At 302d, the method includes adding the block CP to the at least one of the repeated RS and the message.

Figure 3C:
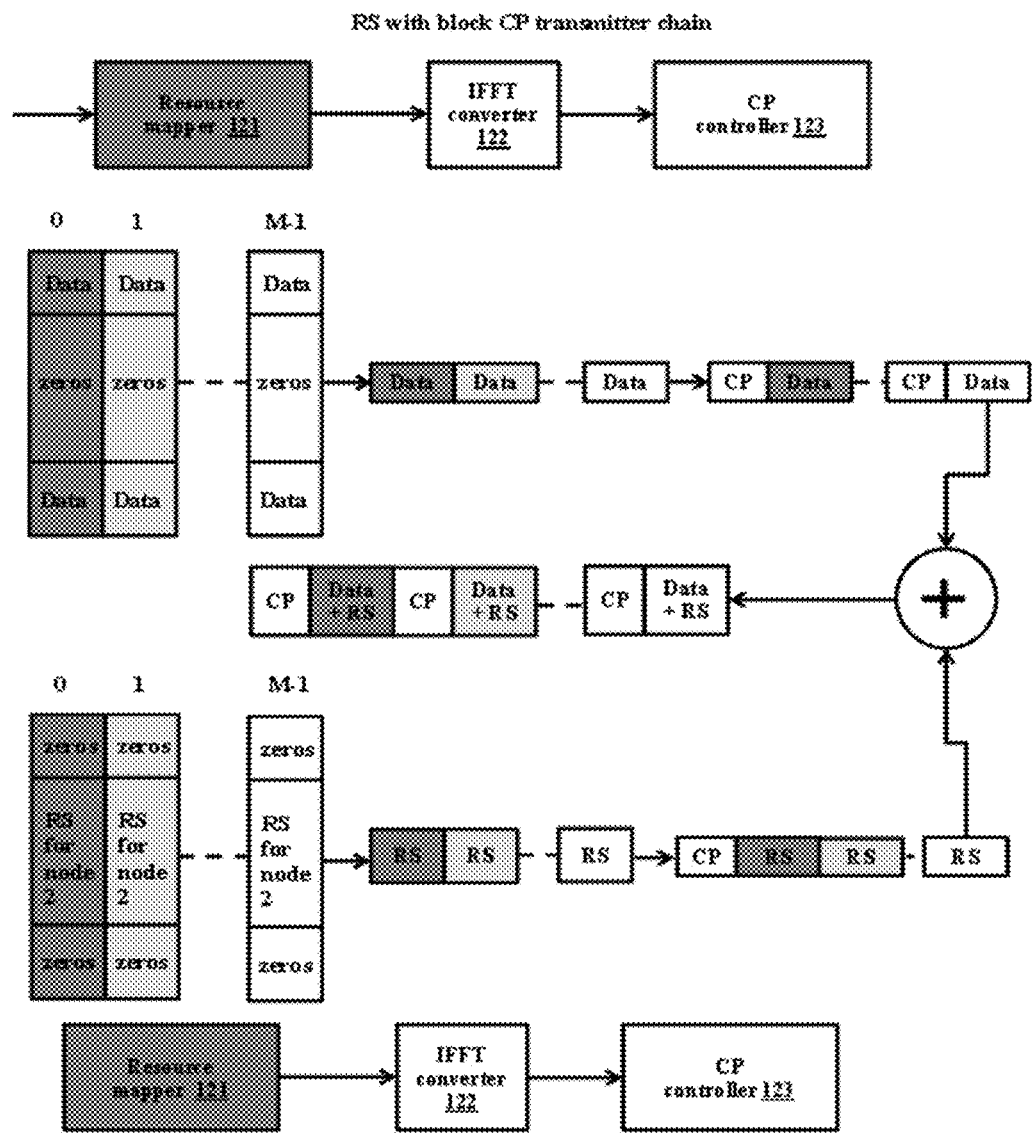
FIG. 3C illustrates a Reference Signal (RS) with a block Cyclic Prefix (CP) transmitter chain, according to embodiments as disclosed herein.

FIG. 3C illustrates the RS with the block CP transmitter chain, according to embodiments as disclosed herein. Transmit signal design for asynchronous detection for a transceiver. The transmit signal which consists of RS and/or broadcast message or any other message, that needs to be asynchronously detected at the receiver is generated and detected as described below. Repetition of information over 'M' symbols.

In an embodiment, the RS or message is repeated over 'M' symbols where the 'M' is greater than one and transmitted with a block CP for all the M symbols. FIG. 3C shows an example of RS transmission. The RS in the figure can be substituted by any other message to be transmitted.

Figure 4A:
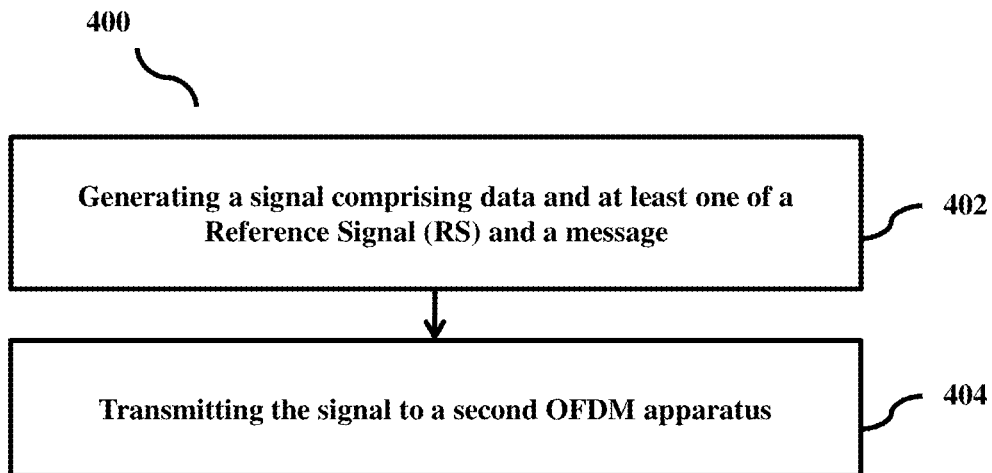
FIG. 4A is a flow diagram illustrating another transmitting method for managing communication operations in the OFDM system, according to an embodiment as disclosed herein.

FIG. 4A is a flow diagram 400 illustrating another transmitting method for managing communication operations in the OFDM system, according to an embodiment as disclosed herein. The operations (402-404) are performed by the first OFDM apparatus (100).

At 402, the method includes generating a signal comprising data and at least one of a Reference Signal (RS) and a message. At 404, the method includes transmitting the signal to a second OFDM apparatus (200).

Figure 4B:
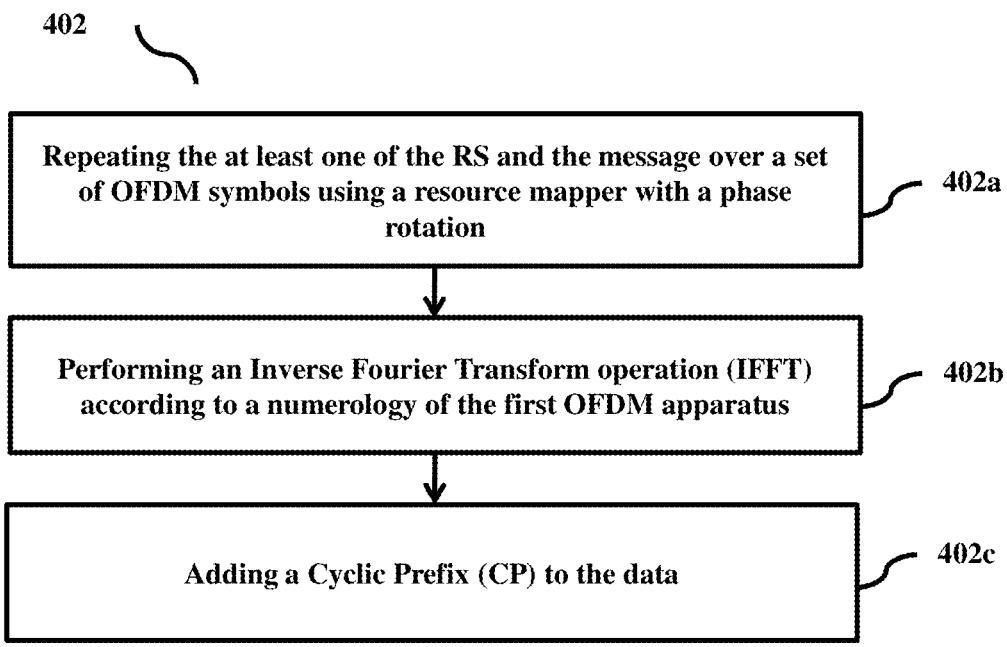
FIG. 4B is a flow diagram illustrating a method for generating a signal using a resource mapper with a phase rotation, according to an embodiment as disclosed herein.

FIG. 4B is a flow diagram 402 illustrating a method for generating the signal using the resource mapper (121) with a phase rotation, according to an embodiment as disclosed herein. The operations (402a-402c) are performed by the first OFDM apparatus (100)

At 402a, the method includes repeating the at least one of the RS and the message over a set of OFDM symbols using the resource mapper (121) with the phase rotation. At 402b, the method includes performing an Inverse Fourier Transform operation (IFFT) according to a numerology of the first OFDM apparatus (100). At 402c, the method includes adding a Cyclic Prefix (CP) to the data.

In an embodiment, the phase rotation is performed to maintain a time domain circularity over a symbol at the second OFDM apparatus (200).

In an embodiment, repeating the at least one of the RS or the message over the set of OFDM symbols comprises transmit at least one of the RS and the message in a first symbol of the set of OFDM symbols without the phase rotation and repeat at least one of the same RS and the same message in consecutive symbols with the phase rotation.

In an embodiment, repeating the at least one of the RS or the message over the set of OFDM symbols comprises transmit at least one of the RS and the message the set of OFDM symbols with the phase rotation except a last symbol of the set of OFDM symbols, wherein the last symbol of the set of OFDM symbols is filled without the phase rotation.

In an embodiment, symbol boundaries of the set of OFDM symbols are not in sync with the second OFDM apparatus (200), when the signal is received at the second OFDM apparatus (200).

In an embodiment, repeating the at least one of the RS and the message over the set of OFDM symbols comprises performing one of repeating the at least one of the RS and the message over the set of OFDM symbols when the numerology at the first OFDM apparatus (100) is same as the numerology at the second OFDM apparatus (200), wherein the set of OFDM symbols are greater than one, repeating the at least one of the RS and the message over the set of OFDM symbols when the numerology at the first OFDM apparatus (100) is higher than the numerology at the second OFDM apparatus (200), wherein the set of OFDM symbols depends on a ratio of the numerology of the first OFDM apparatus (100) to the numerology of the second OFDM apparatus (200), and interleaving the at least one of the RS and the message in a frequency domain and repeating the at least one of the RS and the message over the set of OFDM symbols when the numerology at the first OFDM apparatus (100) is lower than the numerology at the second OFDM apparatus (200), wherein the interleaving is performed based on the ratio of the numerology of the first OFDM apparatus (100) to the numerology of the second OFDM apparatus (200).

In an embodiment, at least one of the RS and the message is spread over a predefined bandwidth, wherein the predefined bandwidth is in multiple of Resource Blocks (RBs) fully or partially span over a configured bandwidth, and wherein the RBs are allocated in a consecutive manner or a continuous manner to avoid possible contamination of reception.

In an embodiment, the set of OFDM symbols is determined as a function of at least one of the numerology used at the first OFDM apparatus (100), the numerology used at the second OFDM apparatus (200), and a propagation delay.

In an embodiment, adding a node identifier in a sequence used for generating the RS to identify the interference at the second OFDM apparatus (200), wherein the node identifier indicates at least one of an interfering node, a group of interfering nodes, a cell, and an interference level, wherein the interference is one of a remote interference and a cross-link interference.

In an embodiment, the sequence used for generating the RS is transmitted orthogonally in at least one of a code, the frequency domain, the time domain, and a space domain across various nodes in the OFDM system, based on the at least one of the node identifier and an interference level and a number of affected symbols.

In an embodiment, in the time domain, the orthogonality is achieved by one of a node transmits the RS at one-time unit while all the other nodes are receiving the RS and a node receives the RS at one instant while all other nodes are transmitting the RS.

In an embodiment, the node identifier is associated with one of the first OFDM apparatus (100) indicating that the first OFDM apparatus (100) is facing the interference from the second OFDM apparatus (200), and the interfering node indicating that the interfering node is causing the interference at the first OFDM apparatus (100).

In an embodiment, the remote interference at the first OFDM apparatus (100) is detected when an Interference over Thermal (IOT) meets a predefined threshold, wherein the IOT is the interference level measured above a thermal noise level at the second OFDM apparatus (200).

In an embodiment, the number of affected symbols in a transmission is determined at, at least one of the first OFDM apparatus (100) from the group of first OFDM apparatus (100) based on at least one of IOT value and a signal to interference plus noise ratio (SINR).

In an embodiment, the number of affected symbols are included in the at least one RS.

In an embodiment, the at least one RS is configured in a fixed measurement window in terms of symbols or slots, and wherein the measurement window derived at a point where one of a DL-to-UL transition or a DL-to-UL transition occurs.

In an embodiment, the at least one RS is reported at a beginning of the measurement window.

Figure 4C:
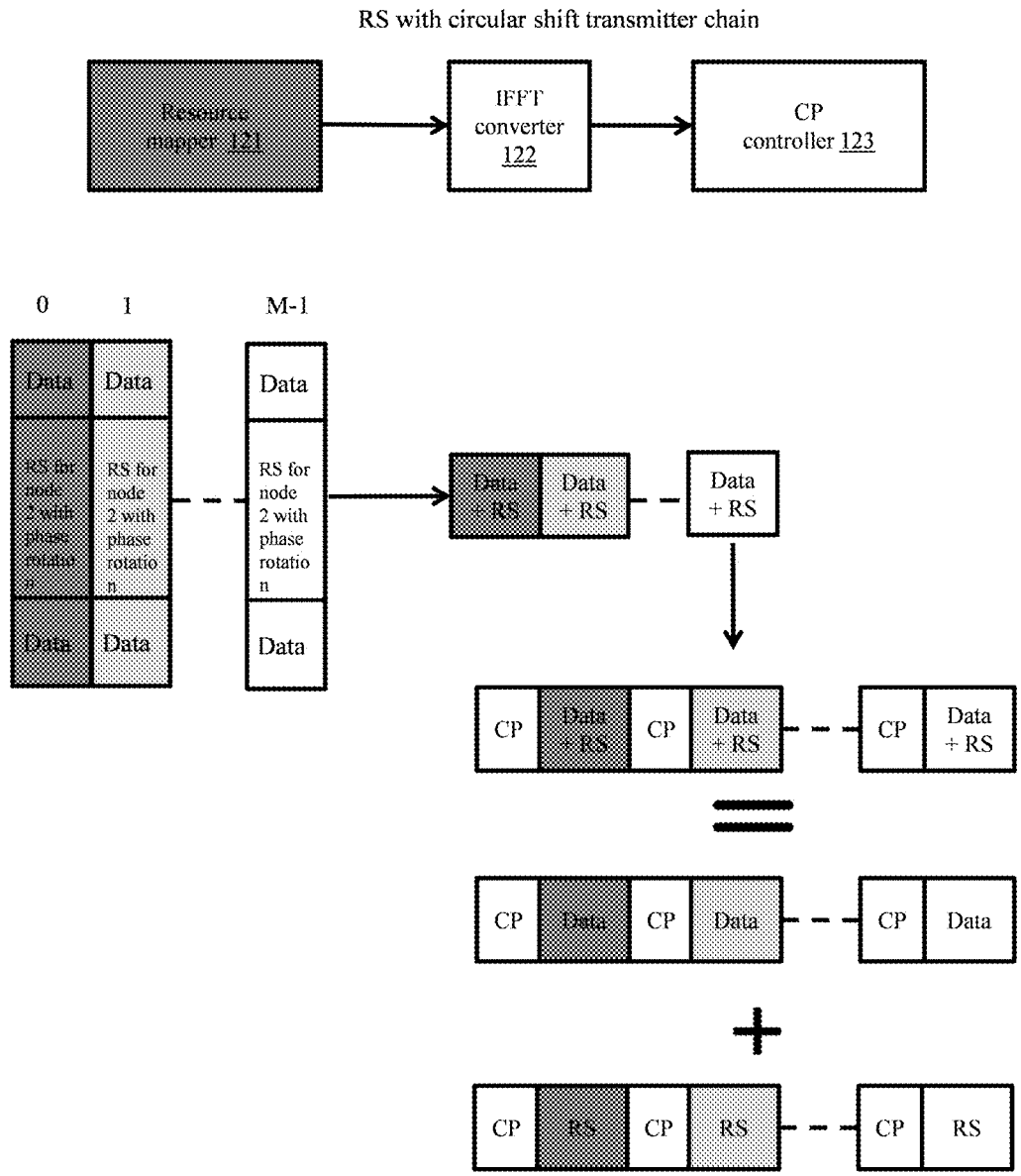
FIG. 4C illustrates the RS with a circular shift transmitter chain, according to embodiments as disclosed herein.
Figure 4D:
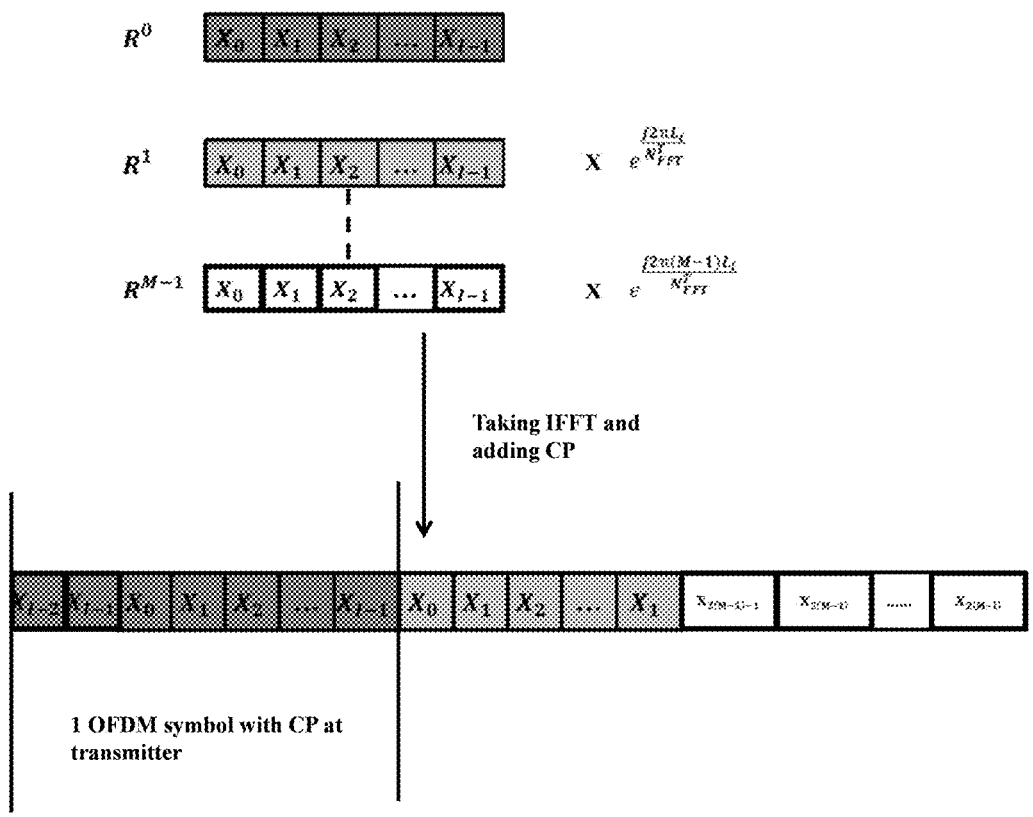
FIG. 4D illustrates effect of taking an Inverse Fourier Transform (IFFT) and adding CP to a phase rotated repeated sequences, according to embodiments as disclosed herein.

FIG. 4C illustrates the RS with a circular shift transmitter chain, according to embodiments as disclosed herein. Another embodiment is to transmit the RS or message in the first symbol and repeat the same in consecutive M−1 symbols with a phase rotation as given in equation (1). FIG. 4C shows the transmitter chain for this method for RS transmission. As a result, after taking IFFT and adding CP, the time domain sequence will be repeated as shown in FIG. 4D for CP length of 2 samples. The detailed description is given in the FIG. 4D.

FIG. 4D illustrates effect of taking the IFFT and adding CP to the phase rotated repeated sequences, according to embodiments as disclosed herein. The information to be filled in each OFDM symbol is given below. Rm is the information to be filled in the mth OFDM symbol, i is the subcarrier index, X is the information like the actual message or the base sequence of RS, L is the number of samples in CP and $N_{FFT}^T$ is the FFT size at the transmitter.

$$R_i^m = X_i e^{\frac{j2\pi mLi}{N_{FFT}^T}} \quad (1)$$

The RS or message are spread over a predefined bandwidth. The bandwidth is in multiple resource blocks (RB) span over the configured bandwidth fully or partially. The RBs are allocated in a consecutive or continuous manner to avoid possible contamination of while reception. M is a function of numerology used at the transmitter, numerology used at the receiver, propagation delay.

Figure 5A:
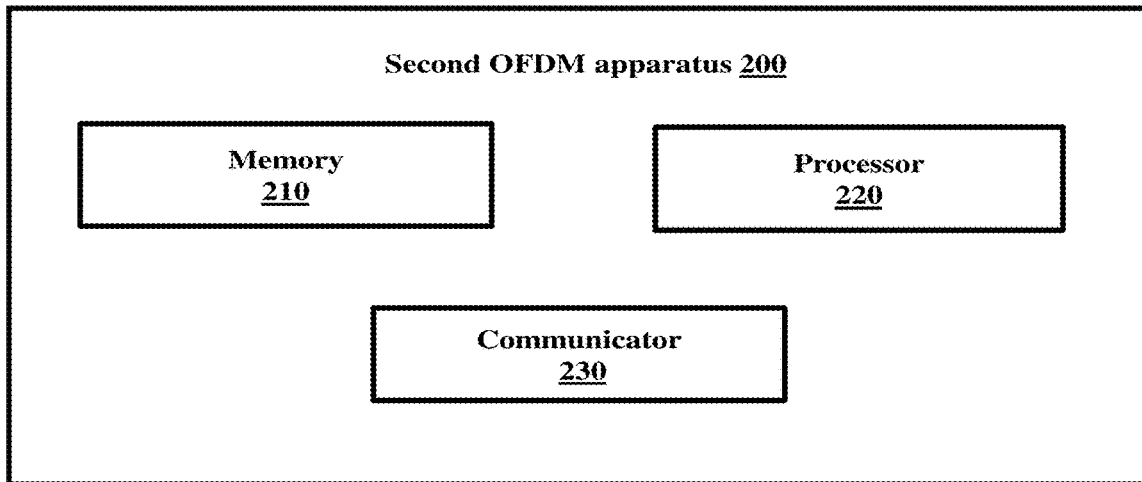
FIG. 5A illustrates a block diagram of a second OFDM apparatus for managing communication operations in the OFDM system, according to an embodiment as disclosed herein.

FIG. 5A illustrates a block diagram of a second OFDM apparatus (200) for managing communication operations in the OFDM system, according to an embodiment as disclosed herein. In an embodiment, the second OFDM apparatus (200) includes a memory (210), a processor (220), and a communicator (230). The second OFDM apparatus (200) can be, for example, but not limited to a smartphone, base station or a like.

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache).

The processor (220) communicates with the memory (210), and the communicator (230). In an embodiment, the memory (210) can be an internal storage unit or it can be an external storage unit of the second OFDM apparatus (200), a cloud storage, or any other type of external storage. The processor (220) is configured to execute instructions stored in the memory (210) and to perform various processes.

In an embodiment, the processor (220) is configured to receive a signal comprising data and at least one of a Reference Signal (RS) and a message from a first OFDM apparatus (100), wherein the RS and the message is repeated over the set of OFDM symbols. Further, the processor (220) is configured to filter a desired band containing at least one of the RS and the message from the reference signal. Further, the processor (220) is configured to remove a cyclic prefix from the signal. Further, the processor (220) is configured to decode at least one of the RS and the message from the signal with adjusting a circular shift in the set of symbol.

Further, the processor (220) is configured to estimate an interference by monitoring consecutive slots or symbols for the interference. Further, the processor (220) is configured to detect the estimated interference in the slots or symbols being monitored meets a predefined threshold set by a network entity or by the second OFDM apparatus (200). Further, the processor (220) is configured to mitigate the interference by performing one of adjusting a Guard Period (GP), adjusting a UL power, adjusting a DL power, switching to a bandwidth part (BWP), tilting a direction of a beam to avoid interference, and nullifying a beam in a direction of incoming interference.

In an embodiment, a circular shift in the set of symbol is determined and compensated to detect original transmitted information from the signal when a frequency domain correlation is used to detect a sequence of the RS.

In an embodiment, decoding the at least one of the RS and the message from the signal using the FFT operation according to the numerology of the second OFDM apparatus (200).

In an embodiment, determining at least one of an interfering node and an interference level based on a node identifier indicated in a sequence used for generating the RS.

In an embodiment, the at least one of the RS and the message is spread over a predefined bandwidth, wherein the predefined bandwidth is in multiple of group of Resource Blocks (RBs) fully or partially span over a configured bandwidth, wherein the group of RBs are allocated in a consecutive manner or a continuous manner to avoid possible contamination of reception.

In an embodiment, the set of OFDM symbols is determined as a function of at least one of the numerology used at the first OFDM apparatus (100), the numerology used at the second OFDM apparatus (200), and a propagation delay.

In an embodiment, the node identifier is associated with one of the first OFDM apparatus (100) indicating that the first OFDM apparatus (100) is facing the interference from the second OFDM apparatus (200), and the interfering node indicating that the interfering node is causing the interference at the first OFDM apparatus (100).

In an embodiment, terminating the estimation of the interference when the second OFDM apparatus (200) is not able to observe the at least one RS in a measurement period.

The communicator (230) is configured for communicating internally between internal hardware components and with external devices via one or more networks.

Although the FIG. 5A shows various hardware components of the second OFDM apparatus (200) but it is to be understood that other embodiments are not limited thereon. In other embodiments, the second OFDM apparatus (200) may include less or more number of components. Further, the labels or names of the components are used only for illustrative purpose and does not limit the scope of the invention. One or more components can be combined together to perform the same or substantially similar function for managing communication operations in the OFDM system.

Figure 5B:
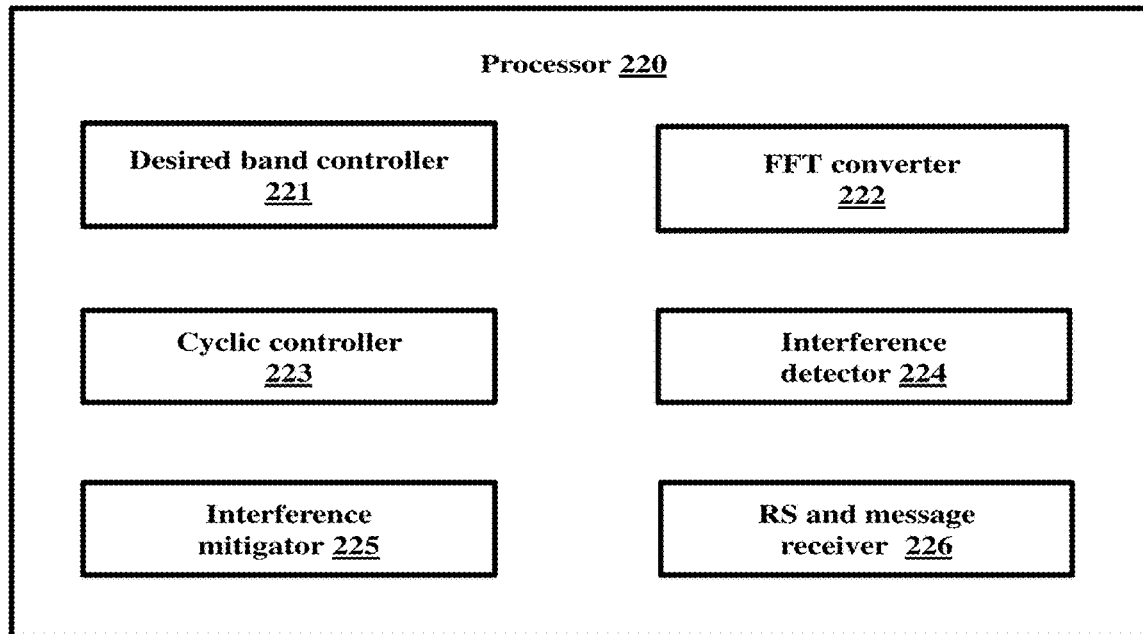
FIG. 5B illustrates a block diagram of a processor of the second OFDM apparatus, according to an embodiment as disclosed herein.

FIG. 5B illustrates a block diagram of the processor (220) of the second OFDM apparatus (200), according to an embodiment as disclosed herein. In an embodiment, the processor (220) includes a desired band controller (221), a FFT converter (222), a cyclic controller (223), an interference detector (224), an interference mitigater (225), and RS and message receiver (226).

In an embodiment, the desired band controller (221) filters the desired band containing at least one of the RS and the message from the reference signal. The FFT converter (222) performs FFT operation according to the numerology of the second OFDM apparatus (200). The cyclic controller (223) removes the cyclic prefix from the signal. The interference detector (224) estimates the interference by monitoring consecutive slots or symbols for the interference. Further, the interference detector (224) detects the estimated interference in the slots or symbols being monitored meets the predefined threshold set by a network entity or by the second OFDM apparatus (200).

In an embodiment, the interference mitigater (225) mitigates the interference by performing one of adjusting the GP, adjusting the UL power, adjusting the DL power, switching to the BWP, tilting the direction of a beam to avoid interference, and nullifying the beam in the direction of incoming interference. The RS and message receiver (226) receive the signal comprising data and at least one of the RS and the message from the first OFDM apparatus (100), wherein the RS and the message is repeated over the set of OFDM symbols.

Figure 5C:
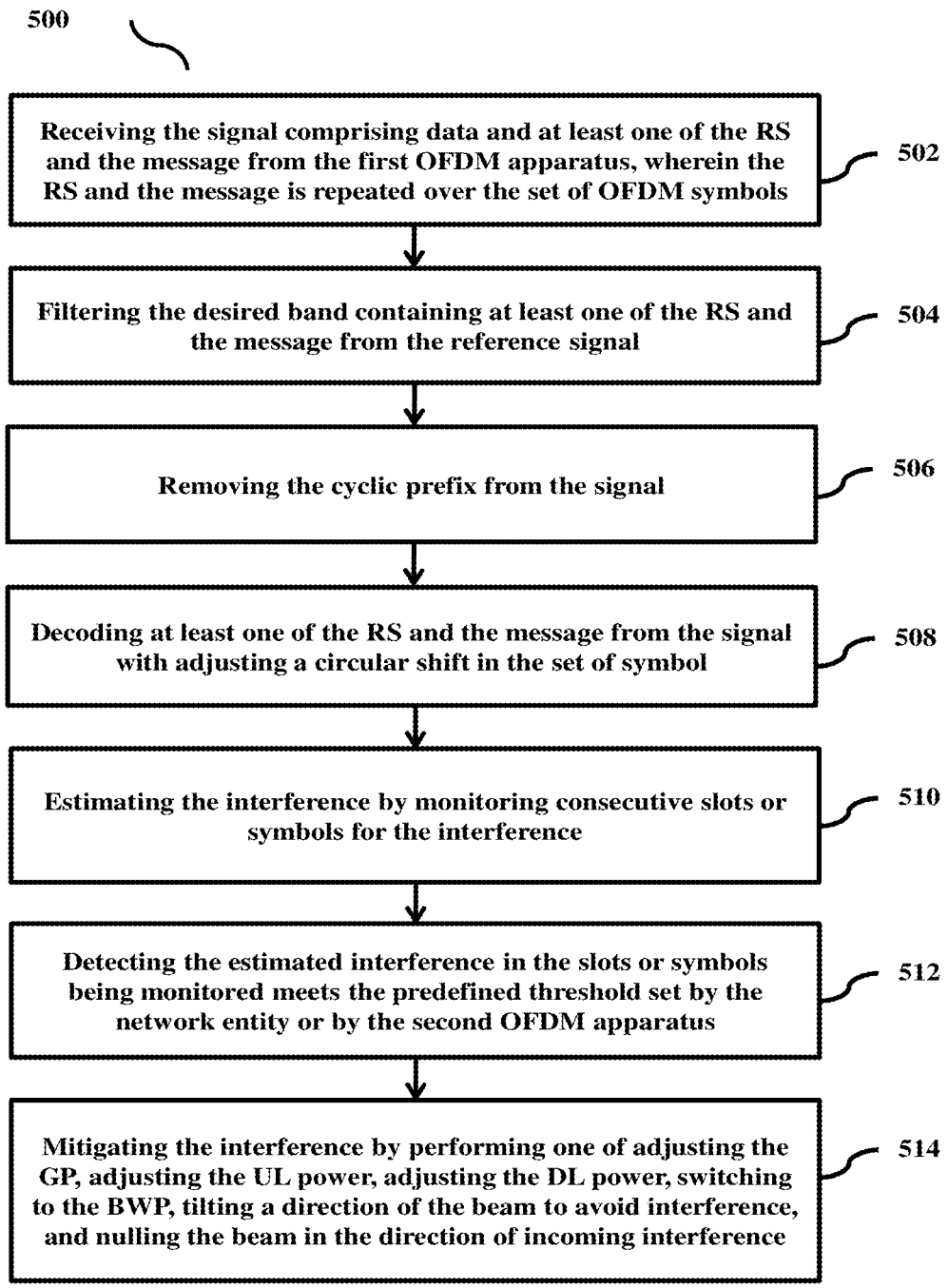
FIG. 5C is a flow diagram illustrating a receive method for managing communication operations in the OFDM system, according to an embodiment as disclosed herein.

FIG. 5C is a flow diagram 500 illustrating a receive method for managing communication operations in the OFDM system, according to an embodiment as disclosed herein. The operations (502-514) are performed by the second OFDM apparatus (200).

At 502, the method includes receiving the signal comprising data and at least one of the RS and the message from the first OFDM apparatus (100), wherein the RS and the message is repeated over the set of OFDM symbols. At 504, the method includes filtering the desired band containing at least one of the RS and the message from the reference signal. At 506, the method includes removing the cyclic prefix from the signal. At 508, the method includes decoding at least one of the RS and the message from the signal with adjusting a circular shift in the set of symbol. At 510, the method includes estimating the interference by monitoring consecutive slots or symbols for the interference. At 512, the method includes detecting the estimated interference in the slots or symbols being monitored meets the predefined threshold set by the network entity or by the second OFDM apparatus (200). At 514, the method includes mitigating the interference by performing one of adjusting the GP, adjusting the UL power, adjusting the DL power, switching to the BWP, tilting a direction of the beam to avoid interference, and nullifying the beam in the direction of incoming interference.

Figure 5D:
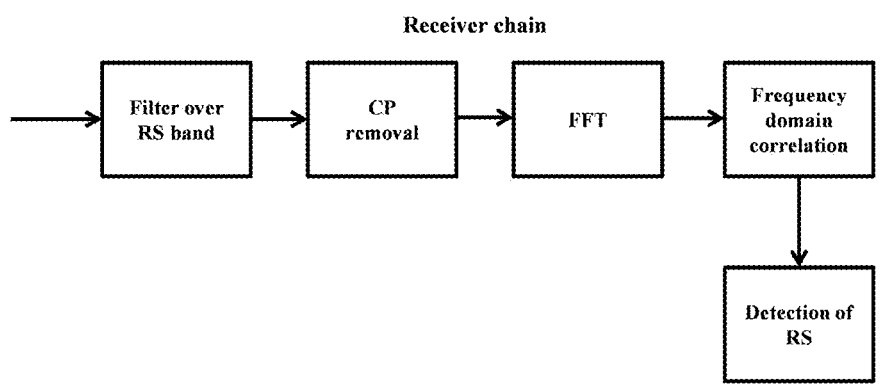
FIG. 5D illustrates receiver chain with respect to the RS, according to embodiments as disclosed herein.

FIG. 5D illustrates receiver chain with respect to the RS, according to embodiments as disclosed herein. The receiver chain is shown in FIG. 5D with respect to RS as an example. During reception, the receiving node filters the desired band containing the required signal.

Figure 5E:
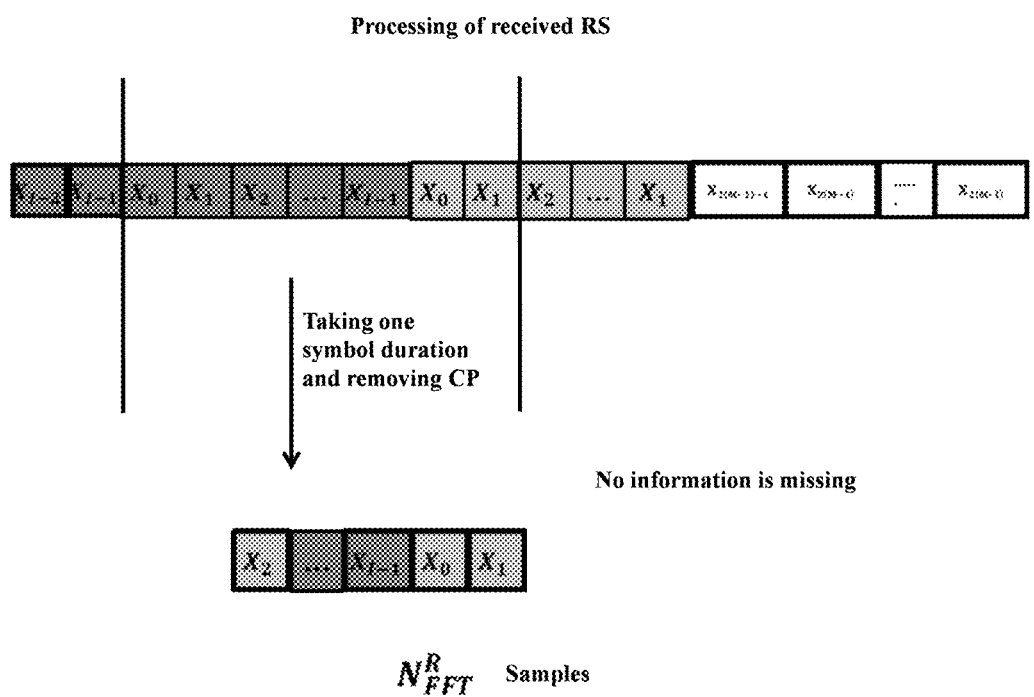
FIG. 5E illustrates a receiver processing samples, according to embodiments as disclosed herein.

FIG. 5E illustrates a receiver processing samples, according to embodiments as disclosed herein. For receiver processing, samples equivalent to one OFDM symbol duration (of size $N_{FFT}^R$) is taken as shown in FIG. 5E. The boundaries will not match with the exact OFDM symbol boundaries of the transmitted signal. This is because the propagation delay is unknown at the receiver, or due to multiple numerology transmission. Due to the repetition inherent in the received time-domain signal, the full information corresponding to one transmitted OFDM symbol is retained. After removal of CP and taking FFT according to the receiver's numerology, the message is decoded. In the case of RS, frequency domain correlation is used to detect the transmitted sequence. The circular shift in the received symbol needs to be determined and compensated to detect the original transmitted information as given in equation (2). R is the received symbol in the frequency domain, $N_{FFT}^R$ is the FFT size at receiver and LShift is the circular shift.

$$X_i = R_i e^{\frac{-j2\pi mi(L+L_{shift})}{N_{FFT}^R}} \quad (2)$$

Figure 6:
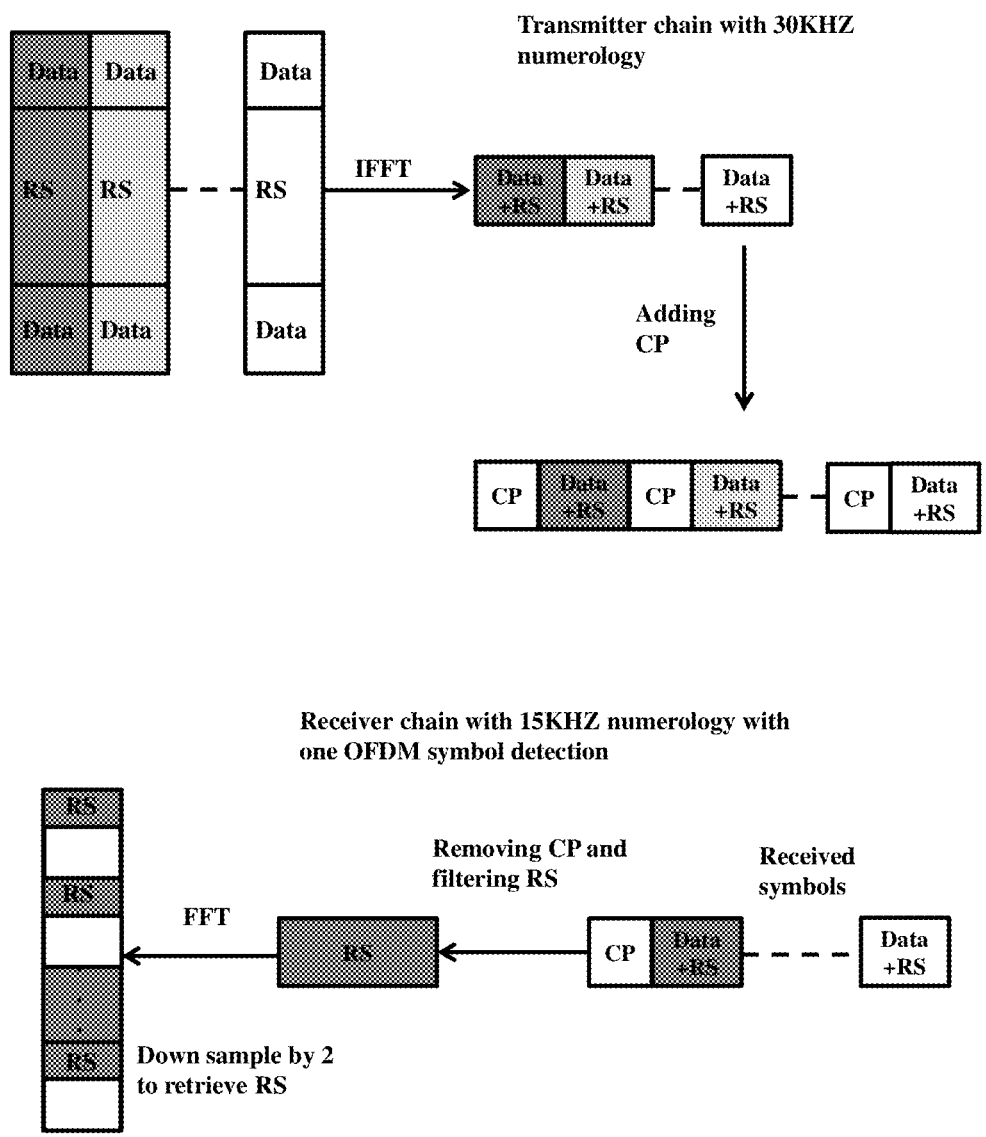
FIG. 6 illustrates a transmit and receive chain for RS transmission in higher numerology as compared to reception, according to embodiments as disclosed herein.

FIG. 6 illustrates transmit and receive chain for RS transmission in higher numerology as compared to reception, according to embodiments as disclosed herein.

In this case, the transmission of RS or broadcast message will be as in section "Repetition of information over 'M' symbols" whereas for the reception, after FFT, down-sampling is done with a down-sampling factor equal to the ratio of numerology of transmission to the numerology of reception. The IFFT size at the transmitter will be according to transmitter numerology and FFT size at a receiver according to receiver numerology. The circular shift in the received symbol needs to be determined and compensated to detect the originally transmitted information as given in equation (2). For e.g. In FIG. 6, the transmitter and receiver chains for 30 kHz and 15 kHz are shown respectively for RS.

Figure 7:
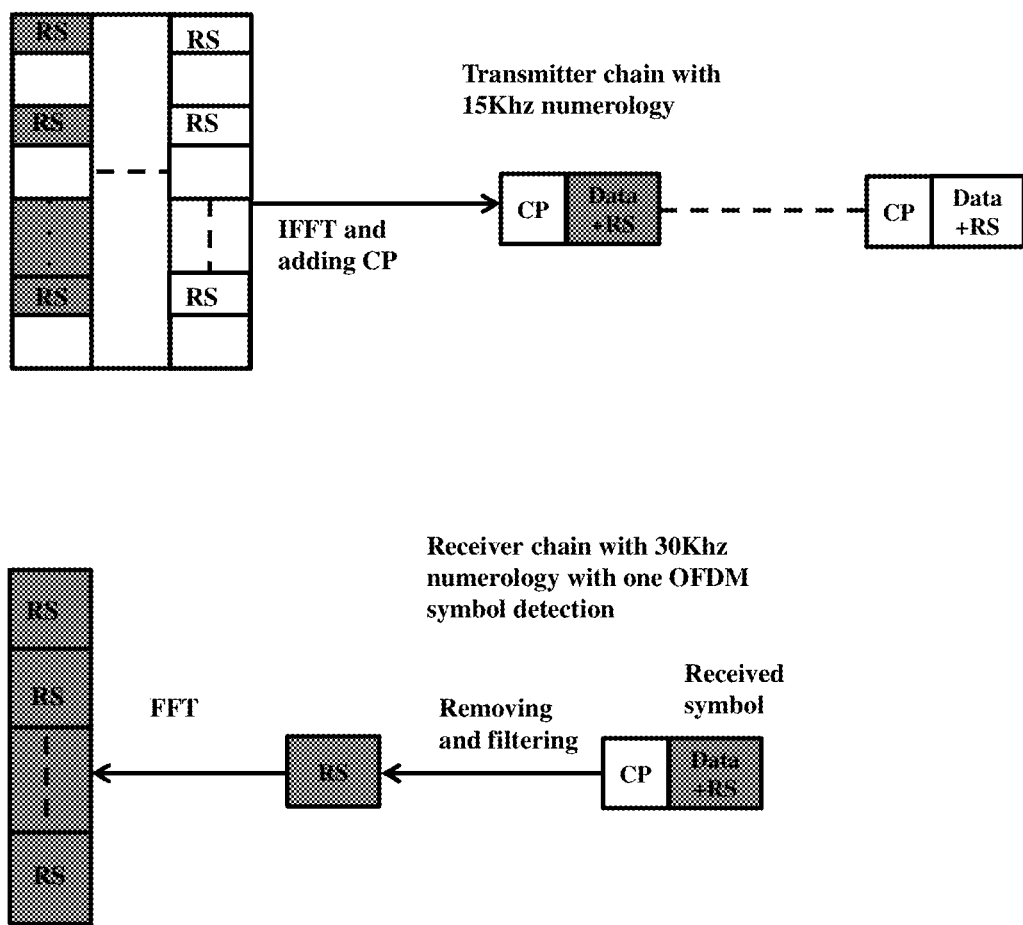
FIG. 7 illustrates a transmit and receive chain for RS transmission in lower numerology as compared to reception, according to embodiments as disclosed herein.

FIG. 7 illustrates transmit and receive chain for RS transmission in lower numerology as compared to reception, according to embodiments as disclosed herein.

In this case, transmitter transmits the RS or broadcast message in comb-like structure (interleaved frequency division multiple access (IFDMA)) with a repetition factor equal to the ratio of numerology of reception to the numerology of transmission. The IFFT size at the transmitter will be according to transmitter numerology and FFT size at a receiver according to receiver numerology. The circular shift in the received symbol needs to be determined and compensated to detect the originally transmitted information as given in equation (2). For e.g. in FIG. 7, the transmitter and receiver chains for 15 kHz and 30 kHz are shown respectively for RS.

FIG. 8 illustrates a slot structure of four base stations (BS) to aid an interference measurement, according to embodiments as disclosed herein.

In Management of interference using RS designed for asynchronous detection, (a) Detection of Interference Occurrence and measurement:

A node transmits RS as described in the previous section, which is detected at the receiving nodes to either find out the interfering node or measure the level of interference or both. To find out the interfering node, the sequence generated for RS should convey the node ID. Across different nodes, the RS sequence can be transmitted orthogonally in code, frequency, and time or space domain. In an embodiment, the nodes exchange information regarding the transmission and reception of RS in case of multiple interfering nodes to be detected. For e.g., the time domain orthogonality is achieved in 2 ways: (i) only one node transmits RS at one instant while all the other nodes are receiving. (ii) Only one node receives RS at one instant while all the other nodes are transmitting. In both cases, the exchange of information among the nodes is necessary. A node should know at what instant it should transmit RS and the symbols in which it should monitor/measure RS from other nodes.

As an example, FIG. 8 shows the slot structure of 14 OFDM symbols as in NR of 4 BSs BS1, BS2, BS3, BS4 participating in interference measurement. D, U and X stand for DL, UL and flexible symbols respectively. The flexible symbol means that the symbol will be configured dynamically to either UL or DL or reserved (neither UL nor DL). XU represents special UL where RS is monitored/measured. When BS1 transmits RS in DL in the first symbol, the other BSs are in either UL or flexible mode to receive and measure the RS.

Thus, the BSs should adopt the slot structure depending on the transmission and reception of RS for interference measurement. In this case, symbols with D and XU need to be retained while the rest of the symbols should be decided according to network traffic.

(b) Detection of Remote Interference Occurrence Between BSs and Measurement:
  i. At the BS during UL reception, when the interference over Thermal (IOT), which is the interference level measured above the thermal noise level at the receiver, is observed beyond predefined threshold then the BS can conclude that interference is present.
  ii. After confirming the presence of interference, the BS calculates the number of symbols affected in UL. To calculate this, the BS checks the IOT value or instantaneous signal to interference and noise ratio (SINR) or both to detect the number of symbols affected. This will provide the approximate ring of possible BSs causing the interference. BS reports this information to the network.
  iii. Network monitors the BSs for similar reports. If the victim BS (BS that observes interference) also affects the aggressor stations (BS which causes interference) in a similar way then reciprocity holds true.
  iv. Either victim or aggressor or both the BSs are configured to transmit RS for interference measurement in a fixed measurement window. This will be conveyed to BSs via operations, administration, and management (OAM) entity.
  v. RS are configured in the fixed measurement window. This window is in terms of few symbols, or slots. It will be configured to the node by higher layered signalling. The measurement window is at the instant where DL to UL transition happens. Measurement window will be overlapped with a flexible DL-UL configuration of symbols as in NR.
  vi. RS are transmitted at the beginning of the measurement window and monitored in the last 'N' symbols of the measurement window. 'N' value is configured by higher layered signal like RRC or MAC-CE or L1 signalling like DCI.
  vii. Sequence is generated to convey the group ID or cell ID or node ID of the node or group of nodes transmitting the RS.
  viii. Group of BSs use the same sequence which is less than CP duration size. BSs can be grouped based on the radius of distance depending on CP duration.
  ix. Across different BSs, RS sequence orthogonality can be achieved in code, frequency, and time and space domain.
  x. The RS will be asynchronously received and detected. The victim BSs will detect the aggressor BSs or vice versa.

(c) Remote Interference Mitigation:
BS will monitor a few consecutive slots for IOT. If the estimated interference in the symbols being monitored is beyond the predefined threshold set by either network or by BS, then the following actions can be taken:
At Victim BS side:
  i. Adjust the GP: Based on the number of symbols above the threshold, the GP can be proportionally extended.
  ii. Adjust the UL power: UL power can be adjusted such that the UL signal strength is improved.
  iii. Switch to another bandwidth part (BWP): BS can switch to a different BWP to avoid the interference.
  iv. Beam switching: Victim BS can tilt the receiving beam vertically downwards to avoid interference.
  v. Beam nullifying: Victim BS can create complete null in the direction of incoming interference. The received RS can be used to find the direction of arrival of interference.
At Aggressor BS Side:
  i. Beam switching: Aggressor BS can adjust the direction of transmit beam such that it reduces the interference to other BSs.
  ii. Adjust the GP: The GP can also be adjusted at the aggressor BS side to minimize the interference.

(d) Termination of Remote Interference Measurement:
Termination can be performed based on different conditions.
  i. If the victim BS takes corrective measure and the IOT is reduced, then BS can release itself from the interference management and convey the same to network.
  ii. If the victim BS is not able to observe the RS in the measurement period or whether the interference is below the threshold, then it can withdraw itself from the interference management.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for data communication in an Orthogonal Frequency Division Multiplexing (OFDM) system, comprising:
    receiving, by a second OFDM apparatus, a plurality of parameters, a signal comprising data and at least one of a Reference Signal (RS) and a message from a first OFDM apparatus in the OFDM system, wherein the plurality of parameters comprises at least one of a numerology of the first apparatus, a numerology of the second apparatus, a ratio of numerology of the first apparatus to the second apparatus and a measurement window, wherein the RS and the message is repeated over a set of OFDM symbols;
    filtering, by the second OFDM apparatus, a desired band containing the at least one of the RS and the message from the received signal;
    removing, by the second OFDM apparatus, a cyclic prefix (CP) from the filtered signal; and
    decoding, by the second OFDM apparatus, at least one of the RS and the message from the signal with adjusting a circular shift in the set of symbols based on the plurality of parameters, wherein decoding, by the second OFDM apparatus, at least one of the RS and the message from the signal with adjusting the circular shift in the set of symbols based on the plurality of parameters comprises:
        monitoring, by the second OFDM apparatus, at least one OFDM symbol in the set of OFDM symbols of the measurement window over which the signal is received;
        performing, by the second OFDM apparatus, an Fourier Transform operation (FFT) operation on each of the at least one monitored OFDM symbol in the set of OFDM symbols according to the numerology of the second OFDM apparatus; and
        performing, by the second OFDM apparatus, a down sampling operation on each of the at least one monitored OFDM symbol in the set of OFDM symbols with a down-sampling factor equal to the ratio of numerology of the first apparatus to the numerology of the second apparatus.

2. The method as claimed in claim 1, wherein the plurality of parameters are received at the second OFDM apparatus over a higher layer by a Radio Resource Control (RRC) or Medium Access Control (MAC) Control Element (CE) or L1 signaling.

3. The method as claimed in claim 1, wherein a length of the measurement window is equal to a length of at least one OFDM symbols.

4. The method as claimed in claim 1, wherein the set of OFDM symbols is determined as a function of at least one of the numerology used at the first OFDM apparatus, the numerology used at the second OFDM apparatus, and a propagation delay.

5. A second Orthogonal Frequency Division Multiplexing (OFDM) apparatus for data communication in an OFDM system, comprising:
    a memory; and
    a processor, operationally coupled to the memory configured to:
        receive a plurality of parameters, a signal comprising data and at least one of a Reference Signal (RS) and a message from a first OFDM apparatus in the OFDM system, wherein the plurality of parameters comprises at least one of a numerology of the first apparatus, a numerology of the second apparatus, a ratio of numerology of the first apparatus to the second apparatus and a measurement window, wherein the RS and the message is repeated over a set of OFDM symbols;
        filter a desired band containing the at least one of the RS and the message from the received signal;
        remove a cyclic prefix (CP) from the filtered signal; and
        decode at least one of the RS and the message from the signal with adjusting a circular shift in the set of symbols based on the plurality of parameters wherein decode at least one of the RS and the message from the signal with adjusting the circular shift in the set of symbols based on the plurality of parameters comprises:
            monitor at least one OFDM symbol in the set of OFDM symbols of the measurement window over which the signal is received;
            perform an Fourier Transform operation (FFT) operation on each of the at least one monitored OFDM symbol in the set of OFDM symbols according to the numerology of the second OFDM apparatus; and
            perform a down sampling operation on each of the at least one monitored OFDM symbol in the set of OFDM symbols with a down-sampling factor equal to the ratio of numerology of the first apparatus to the numerology of the second apparatus.

6. The second OFDM apparatus as claimed in claim 5, wherein the plurality of parameters are received at the second OFDM apparatus over a higher layer by a Radio Resource Control (RRC) or Medium Access Control (MAC) Control Element (CE) or L1 signaling.

7. The second OFDM apparatus as claimed in claim 5, wherein a length of the measurement window is equal to a length of at least one OFDM symbol.

8. The second OFDM apparatus as claimed in claim 5, wherein the set of OFDM symbols is determined as a function of at least one of the numerology used at the first OFDM apparatus, the numerology used at the second OFDM apparatus, and a propagation delay.

* * * * *